(12) United States Patent
Henkel et al.

(10) Patent No.: US 10,899,210 B2
(45) Date of Patent: Jan. 26, 2021

(54) COMPONENT MOUNTING SYSTEM COMPRISING A COMPONENT MODULE

(71) Applicant: Phoenix Contact GmbH & Co. KG, Blomberg (DE)

(72) Inventors: Hartmut Henkel, Blomberg (DE); Stefan Schmidt, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 139 days.

(21) Appl. No.: 15/114,476

(22) PCT Filed: Jan. 8, 2015

(86) PCT No.: PCT/EP2015/050260
§ 371 (c)(1),
(2) Date: Jul. 27, 2016

(87) PCT Pub. No.: WO2015/117789
PCT Pub. Date: Aug. 13, 2015

(65) Prior Publication Data
US 2016/0359148 A1    Dec. 8, 2016

(30) Foreign Application Priority Data

Feb. 6, 2014    (DE) .................. 10 2014 101 461

(51) Int. Cl.
*H01M 2/10*    (2006.01)
*H01M 2/30*    (2006.01)
(Continued)

(52) U.S. Cl.
CPC ............... *B60K 1/04* (2013.01); *B60L 53/80* (2019.02); *H01M 2/1011* (2013.01);
(Continued)

(58) Field of Classification Search
None
See application file for complete search history.

(56) References Cited

U.S. PATENT DOCUMENTS 3,042,442 A * 7/1962 Schukraft ............ H01M 2/1011
294/92
3,259,365 A   7/1966 Gibson
(Continued)

FOREIGN PATENT DOCUMENTS

CN    101647137 A    2/2010
CN    102666165 A    9/2012
(Continued)

OTHER PUBLICATIONS

ISA/EP International Search Report, Int'l Application No. PCT/EP2015/050260, dated Apr. 15, 2015, European Patent Office, Rijswijk, NL, 19 pgs.

*Primary Examiner* — Zhongqing Wei
(74) *Attorney, Agent, or Firm* — Holland & Hart LLP

(57) ABSTRACT

Aspects of the disclosure relate to a component mounting system comprising an electric component module having a placement bolt; a holding case for accommodating the component module; and an extraction device for pulling the component module out of the holding case, said extraction device having an opening for placing the extraction device onto the placement bolt of the component module.

11 Claims, 3 Drawing Sheets

(51) Int. Cl.
*B60K 1/04* (2019.01)
*B60L 53/80* (2019.01)

(52) U.S. Cl.
CPC ......... *H01M 2/1083* (2013.01); *H01M 2/305* (2013.01); *B60K 2001/0455* (2013.01); *H01M 2220/20* (2013.01); *Y02T 90/12* (2013.01)

(56) References Cited

U.S. PATENT DOCUMENTS

| | | | |
|---|---|---|---|
| 3,618,997 A * | 11/1971 | Cochrane | H01M 2/1011 294/903 |
| 3,809,284 A * | 5/1974 | Churan | B65D 43/0212 220/260 |
| 4,101,038 A | 7/1978 | Palma | |
| 4,283,164 A | 8/1981 | Reaney | |
| 4,808,058 A | 2/1989 | Carney et al. | |
| 5,360,307 A | 11/1994 | Schemm et al. | |
| 2004/0170888 A1 * | 9/2004 | Cummins | B60R 16/04 429/99 |
| 2005/0029984 A1 * | 2/2005 | Cheng | H02J 7/0045 320/107 |
| 2008/0268330 A1 | 10/2008 | Hansen et al. | |
| 2009/0000835 A1 | 1/2009 | Jones et al. | |
| 2010/0114762 A1 * | 5/2010 | Ishii | B60L 11/1803 705/40 |
| 2012/0315117 A1 | 12/2012 | Gilland et al. | |
| 2013/0316212 A1 * | 11/2013 | Lee | H01M 2/0245 429/99 |

FOREIGN PATENT DOCUMENTS

| | | |
|---|---|---|
| DE | 10 2009 034 698 A1 | 1/2011 |
| DE | 10 2013 205 322 A1 | 10/2013 |
| EP | 2 157 637 A1 | 2/2010 |
| EP | 2266828 A3 | 2/2013 |
| FR | 2961771 A1 | 12/2011 |

\* cited by examiner

COMPONENT MOUNTING SYSTEM COMPRISING A COMPONENT MODULE

CROSS-REFERENCE TO RELATED APPLICATIONS

The present application is a 373 national phase filing of International Application No. PCT/EP2015/050260, entitled "COMPONENT MOUNTING SYSTEM COMPRISING A COMPONENT MODULE", filed 8 Jan. 2015, which claims priority to German Patent Application No. 10 2014 101 461.8, entitled "Komponentenmontagesystem mit Komponententnodul", filed 6 Feb. 2014.

BACKGROUND

The present disclosure relates to a component mounting system comprising an insertable electrical component module.

Printed publication EP 0 734 330 B1 relates to a fastening and lifting system for electric vehicle batteries having a strap situated around the batteries by means of which the batteries are bound into a battery pack.

When replacing batteries, a tool is often used to open a housing, yet said tool is then unsuited to extracting the batteries.

The task on which the present disclosure is based is that of enabling the tool-free replacement of electrical components.

SUMMARY

The subject matter solves this task by means of the features of the independent claims. Examples of the principles of this disclosure constitute the subject matter of the figures, the description and the dependent claims.

According to one aspect of the disclosure, the task is solved by a component mounting system comprising an electrical component module having a positioning bolt; a retainer case for the insertion of the component module; and an extraction device for extracting the component module out of the retainer case which has an opening for seating the extraction device onto the positioning bolt of the component module. This thereby achieves the technical advantage of, for example, enabling faster replacement of the electrical component. No rear grip or recess open at the edge is required.

In one example of the component mounting system, the extraction device has a first and a second opening. This thereby achieves the technical advantage of, for example, a force couple being able to be exerted on the component module and being able to prevent tilting during extraction.

In a further example of the component mounting system, the extraction device is formed by a flexible tongue-shaped flat piece. This thereby achieves the technical advantage of, for example, being able to easily seat the extraction device onto the component module.

In a further example of the component mounting system, the extraction device is made of plastic or rubber. This thereby achieves the technical advantage of, for example, a simple manufacturing process for the extraction device.

In a further example of the component mounting system, the extraction device has a hand opening for manual accessing of the extraction device. This thereby achieves the technical advantage of, for example, preventing slippage when pulling on the extraction device.

In a further example of the component mounting system, the extraction device comprises a surface structure profile to prevent slippage when manually pulling on the extraction device. This thereby achieves the technical advantage of, for example, being able to exert a high force on the extraction device.

In a further example of the component mounting system, the positioning bolt is arranged on an upper side of the electrical component module. This thereby achieves the technical advantage of, for example, being able to easily seat the extraction device onto the component module from above.

In a further example of the component mounting system, the positioning bolt is made of metal. This thereby achieves the technical advantage of, for example, a positioning bolt of high stability.

In a further example of the component mounting system, the component module has a first and second positioning bolt. This thereby achieves the technical advantage of, for example, facilitating the extraction of the component module. Even should one positioning bolt be damaged, the component module can be extracted by means of the other positioning bolt.

In a further example of the component mounting system, the first and the second positioning bolt are arranged side by side in a direction of extraction. This thereby achieves the technical advantage of for example, a force couple being able to be exerted on the component module and being able to prevent tilting during extraction.

In a further example of the component mounting system, the positioning bolt is curved opposite to an extraction direction. This thereby achieves the technical advantage of, for example, preventing the extraction device from slipping.

In a further example of the component mounting system, the retainer case has a door to cover the component module. This thereby achieves the technical advantage of for example, preventing the component module from being contaminated.

In a further example of the component mounting system, the extraction device comprises a die-cut operation pictogram. This thereby achieves the technical advantage of for example, the operation pictogram being permanently visible to a user.

In a further example of the component mounting system, the electrical component is a rectangular-shaped battery. This thereby achieves the technical advantage of, for example, realizing a replaceable energy supply in which a used battery can be replaced by a fresh battery without the use of any tool.

In a further example of the component mounting system, the positioning bolt is formed by a terminal of the battery. This thereby achieves the technical advantage of for example, realizing a positioning bolt able to be used both as a voltage source as well as for the extraction of the battery.

BRIEF DESCRIPTION OF THE DRAWINGS

Examples of the principles of this disclosure are depicted in the drawings and will be described in greater detail in the following.

DETAILED DESCRIPTION

Figure 1:
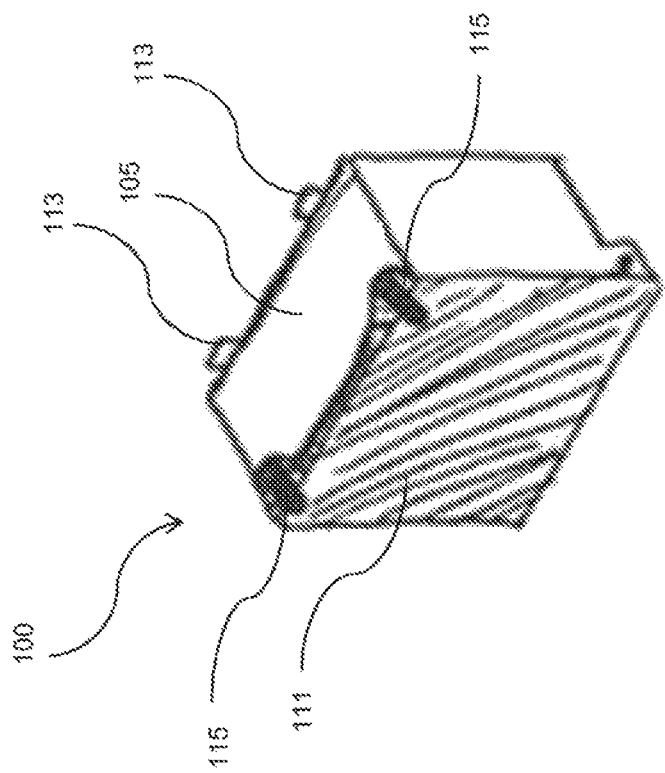
FIG. 1 shows a view of an example of a retainer case.

FIG. 1 shows a view of a component mounting system 100 for electrical components. The component mounting system 100 comprises a retainer case 105 for accommodating the electrical components. The retainer case 105 comprises a wall-mount device 113 by means of which the retainer case 105 can be affixed to a wall. The retainer case 105 is made for example of plastic.

The front of the retainer case 105 can be closed by a hinged door 111. The door 111 is held in the closed state by a locking device 115. The retainer case 105 can contain an electronic component, the service life of which is limited and which needs to be replaced after a certain period of time such as, for example, a lead-acid battery. Replacement is often only possible by technically trained personnel and with the use of a tool.

Figure 2:
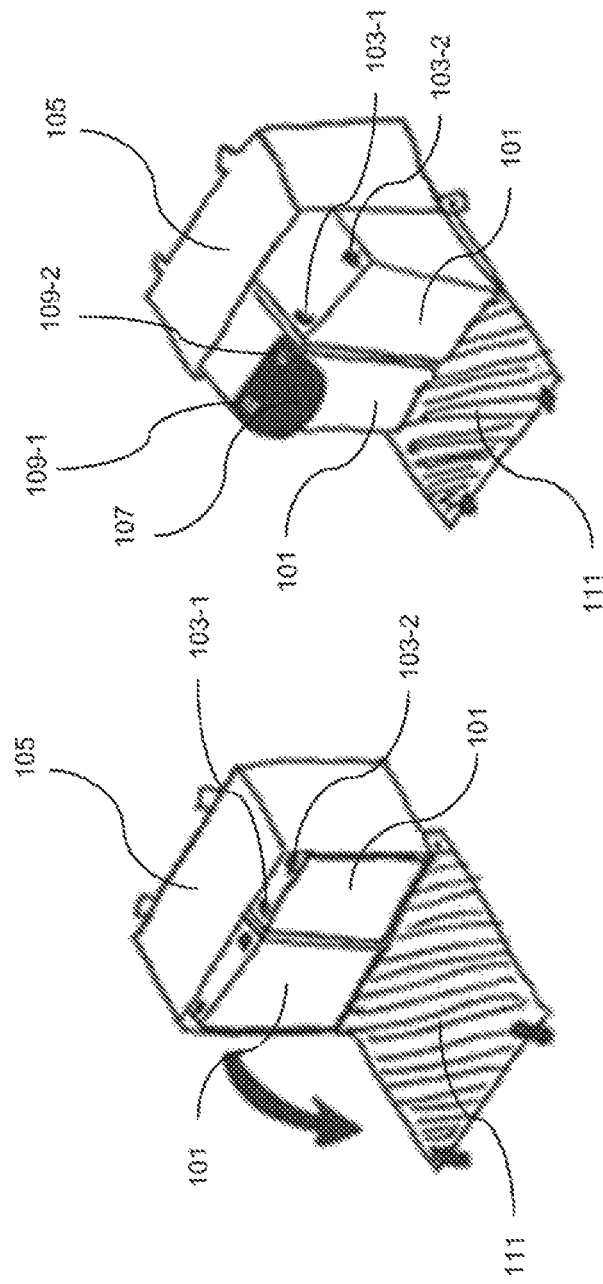
FIG. 2 shows a view of an example of an open retainer case with inserted component module and an extraction device.

FIG. 2 shows a view of an open retainer case 105 with inserted component module 101 and an extraction device 107. The pivot-mounted door 111 is hinged downward. No tool is needed to open the retainer case 105.

Two removable electrical component modules 101 are situated in the retainer case 105. Each component module 101 has two positioning bolts 103-1 and 103-2 which are arranged on an upper side of the component module 101 and project out of said component module 101. The positioning bolts 103-1 and 103-2 are accessible from the front of the retainer case 105. The positioning bolts 103-1 and 103-2 can be formed for example by a metal pin.

An extraction device 107 having two openings 109-1 and 109-2 is used to remove the component module 101, same being set onto the positioning bolts 103-1 and 103-2 from above. The component module 101 is drawn out of the retainer case 105 by pulling on the extraction device 107. The force is thereby transferred to the positioning bolts 103-1 and 103-2 via the two openings 109-1 and 109-2.

After the retainer case 105 is opened, the component modules 111 can be easily removed with the extraction device 107.

Figure 3:
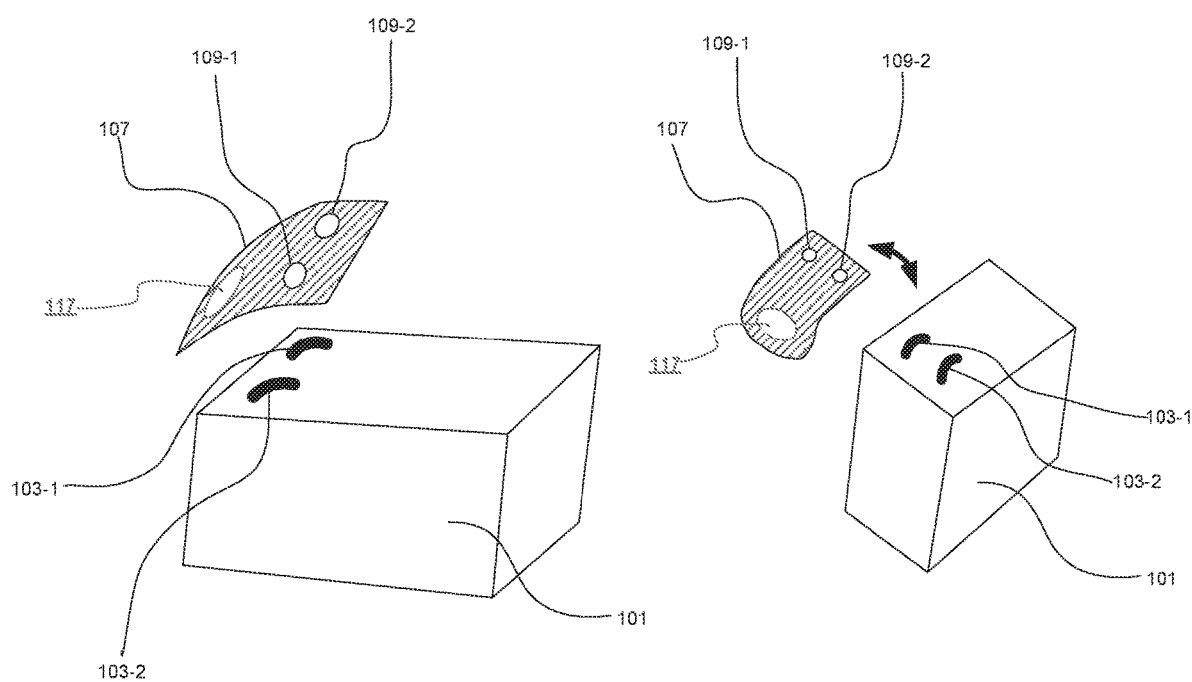
FIG. 3 shows a view of an example of the component module with the extraction device.

FIG. 3 shows a view of the component module 101 with the extraction device 107. The component module 101 is formed for example by a rectangular lead-acid battery. The extraction device 107 is set onto the component module 101 from above.

The two positioning bolts 103-1 and 103-2 are curved opposite to a direction of extraction so that the seated extraction device 107 is pressed when the upper side of the component module 101 is pulled and slippage of the extraction device 107 is prevented. The extraction device 107 can be reused on other component modules 101. After the removal, the extraction device 107 can be set onto another component module 101 so that the extraction device 107 can be used for another removal.

As a result of this configuration, the extraction device 107 can moreover be positioned directly prior to extracting the component module. It is thus not necessary to position the extraction device 107 on the component module 101 prior to insertion into the retainer case 105.

The extraction device 107 is made from a flexible or stiff plastic or rubber piece in which the two openings 109-1 and 109-2 are formed. The position of the openings 109-1 and 109-2 corresponds to the position of the positioning bolts 103-1 and 103-2 on the component module 101. The extraction device 107 has an angled front section for manually applying a tensile force. The extraction device 107 can comprise a further hand opening 117 or a surface structure profile for grasping the extraction device. A die-cut operation pictogram can be disposed on the extraction device 107.

In the case of a lead-acid battery as the component module 101, the terminals can be used as the positioning bolts 103-1 and 103-2. The lead-acid battery can then be easily exchanged and replaced after a particular period of use by a fresh lead-acid battery.

All of the features described and shown in connection with individual examples can be provided in different combinations in the inventive subject matter so as to realize their advantageous effects simultaneously.

The protective scope of the present invention is conferred by the claims and is not limited by the features defined in the description or illustrated in the figures.

LIST OF REFERENCE NUMERALS 100 component mounting system
101 component module
103-1 positioning bolt
103-2 positioning bolt
105 retainer case
107 extraction device
109-1 opening
109-2 opening
111 door
113 wall-mount device
115 locking device
117 hand opening

What is claimed is:

1. A component mounting system comprising:
an electrical component module having a positioning bolt;
a retainer case configured for the insertion of the electrical component module; and
an extraction device removably coupled to the electrical component module and configured for extracting the electrical component module out of the retainer case, wherein the extraction device comprises an opening for seating the extraction device onto the positioning bolt of the electrical component module, wherein the extraction device is formed by a flexible tongue-shaped piece having an angled front section different from a section having the opening for seating the extraction device onto the positioning bolt, wherein the extraction device has a hand opening configured for manual accessing of the extraction device, and wherein the positioning bolt is curved opposite to a direction of extraction;
wherein the extraction device comprises a surface structure profile configured to prevent slippage when the extraction device is manually pulled.

2. The component mounting system according to claim 1, wherein the opening of the extraction device comprises a first opening and the extraction device further comprises a second opening.

3. The component mounting system according to claim 1, wherein the extraction device is made of plastic or rubber.

4. The component mounting system according to claim 1, wherein the positioning bolt is arranged on an upper side of the electrical component module.

5. The component mounting system according to claim 1, wherein the positioning bolt is made of metal.

6. The component mounting system according to claim 1, wherein the positioning bolt of the electrical component module is a first positioning bolt and the electrical component module further comprises a second positioning bolt.

7. The component mounting system according to claim 6, wherein the first positioning bolt and the second positioning bolt are arranged side by side in a direction of extraction.

8. The component mounting system according to claim 1, wherein the retainer case has a door to cover the electrical component module.

9. The component mounting system according to claim 1, herein the extraction device comprises a die-cut operation pictogram.

10. The component mounting system according to claim 1, wherein the electrical component module is a rectangular battery.

11. The component mounting system according to claim 10, wherein the positioning bolt is formed by a terminal of the battery.

* * * * *